(12) United States Patent
Zacks et al.

(10) Patent No.: US 8,600,191 B2
(45) Date of Patent: Dec. 3, 2013

(54) COMPOSITE IMAGING METHOD AND SYSTEM

(75) Inventors: Carolyn A. Zacks, Rochester, NY (US);
Michael J. Telek, Pittsford, NY (US);
Dan Harel, Rochester, NY (US); Frank Marino, Rochester, NY (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 12/975,720

(22) Filed: Dec. 22, 2010

(65) Prior Publication Data

US 2011/0193972 A1 Aug. 11, 2011

Related U.S. Application Data

(60) Continuation of application No. 11/681,499, filed on Mar. 2, 2007, now abandoned, which is a division of application No. 10/431,057, filed on May 7, 2003, now abandoned.

(51) Int. Cl.
| G06K 9/46 | (2006.01) |
| G06K 9/36 | (2006.01) |
| G09G 5/00 | (2006.01) |
| H04N 5/228 | (2006.01) |
| H04N 9/74 | (2006.01) |

(52) U.S. Cl.
USPC ........... 382/284; 382/190; 382/282; 345/637; 348/584; 348/222.1

(58) Field of Classification Search
USPC .................. 382/218, 190, 282, 284; 345/637; 348/584, 222.1
See application file for complete search history.

(56) References Cited

U.S. PATENT DOCUMENTS

| 5,057,019 A | 10/1991 | Harvey |
| 5,164,831 A | 11/1992 | Kuchta et al. |
| 5,638,502 A | 6/1997 | Murata |
| 5,715,325 A | 2/1998 | Bang et al. |
| 5,771,307 A | 6/1998 | Lu et al. |
| 6,272,231 B1 | 8/2001 | Maurer et al. |
| 6,345,274 B1 | 2/2002 | Zhu et al. |
| 6,476,903 B1 | 11/2002 | Slater et al. |
| 6,661,906 B1 | 12/2003 | Kawada et al. |
| 6,778,703 B1 | 8/2004 | Zlotnick |
| 6,897,880 B2 | 5/2005 | Samra |
| 7,024,053 B2 | 4/2006 | Enomoto |
| 7,035,440 B2 * | 4/2006 | Kaku ............................ 382/115 |
| 2001/0046330 A1 | 11/2001 | Shaffer et al. |
| 2002/0076100 A1 | 6/2002 | Luo |
| 2003/0021448 A1 | 1/2003 | Chen et al. |

(Continued)

FOREIGN PATENT DOCUMENTS

JP 2001-45355 2/2001

*Primary Examiner* — Kathleen Y Dulaney
(74) *Attorney, Agent, or Firm* — Wong, Cabello, Lutsch, Rutherford & Brucculeri, LLP

(57) ABSTRACT

In a first aspect of the invention, a method is provided for forming a group image. In accordance with the method, a set of imaging information is obtained depicting a scene over a period of time. Elements in the set of imaging information are distinguished and attributes of the elements in the set of image information are examined. Imaging information is selected from the set of imaging information depicting each element with the selection being made according to the attributes for that element. A group image is formed based upon the set of imaging information with the archival image incorporating the selected image information.

10 Claims, 10 Drawing Sheets

(56) References Cited

U.S. PATENT DOCUMENTS

2003/0053663 A1 3/2003 Chen et al.
2003/0068100 A1* 4/2003 Covell et al. .................. 382/305
2004/0076313 A1 4/2004 Bronstein et al.

* cited by examiner

COMPOSITE IMAGING METHOD AND SYSTEM

CROSS-REFERENCE TO RELATED APPLICATIONS

This application is a continuation of prior U.S. patent application Ser. No. 11/681,499, filed Mar. 2, 2007, which is a divisional of U.S. patent application Ser. No. 10/431,057, filed May 7, 2003 (now abandoned), each of which is incorporated herein by reference in its entirety.

FIELD OF THE INVENTION

The present invention relates to imaging systems and more particularly to imaging systems that are adapted to form images having multiple objects therein.

BACKGROUND OF THE INVENTION

Professional and amateur photographers often capture images of groups of people such as images of families and athletic teams. Such group images are typically used for commemorative purposes. A common problem with such group images is that often one or more members of the group will have an appearance at the time that the group image is captured that the member does not prefer. For example, group members can blink, look away, make a comment or otherwise compose their facial attributes in a non-preferable way. Similar problems can occur whenever images are captured that include more than one element. Examples of such elements include people, as described above, animals, objects, areas such as a background of a scene, and/or any other photographic subject that can change over time. Typically, photographers address this problem by capturing multiple images of the group of elements and selecting from the multiple images a group image that shows all of the elements in the group image having a generally acceptable appearance. Even where this is done, it is often the case that one or more elements has a less than optimal appearance.

Various forms of image editing software can be used to attempt to improve the appearance of elements in a group image. Such editing software typically includes automatic image correction algorithms that can resolve common image problems such as the so-called red-eye problem that can occur in images of people. See, for example, commonly assigned U.S. Patent Application Publication No. 2003/0053663 entitled "Method and Computer Program Products for Locating Facial Features" filed by Chen et al. on Nov. 26, 2001. Further, advanced users of such image editing software can use manual image editing tools such as Adobe PhotoShop™ software sold by Adobe Systems Inc., San Jose, Calif., USA, to manually alter images. It will be appreciated however, that the use of such image editing tools to correct a group image is time consuming and can yield results that have a less than authentic appearance. What is needed therefore is an imaging system and method that can effectively form optimal group images with an authentic appearance in a less time consuming manner.

SUMMARY OF THE INVENTION

In a first aspect of the invention, a method is provided for forming a group image. In accordance with the method, a set of imaging information is obtained depicting a scene over a period of time. Elements in the set of imaging information are distinguished and attributes of the elements in the set of image information are examined. Imaging information is selected from the set of imaging information depicting each element with the selection being made according to the attributes for that element. A group image is formed based upon the set of imaging information with the archival image incorporating the selected image information.

In another aspect of the invention, a method for forming an image is provided. In accordance with this method, a set of imaging information is obtained depicting a scene over a period of time. A base image is provided based on the set of image information. Elements are identified in the base image and portions of the set of imaging information depicting each of the elements are ordered according to an attribute of each element. Imaging information from the set of imaging information is selected depicting each element according to the ordering. An image is formed based upon the set of imaging information with the base image incorporating the selected image information.

In still another aspect of the invention, a method for forming an image is provided. In accordance with this method, images of a scene are obtained at different times. Elements in the images are identified. Attributes for each of the elements in each of the images are determined and it is determined for each element which image shows the element having preferred attributes. An image is prepared of the scene with each element having an appearance that corresponds to the appearance of the element in the image that shows the preferred attributes for the element.

In another aspect of the invention, a computer program product is provided having data stored thereon for causing an imaging system to perform a method for forming a group image. In accordance with the method, a set of imaging information is obtained depicting a scene over a period of time. Elements in the set of imaging information are distinguished and attributes of the elements in the set of image information are examined. Imaging information is selected from the set of imaging information depicting each element with the selection being made according to the attributes for that element. A group image is formed based upon the set of imaging information with the archival image incorporating the selected image information.

In another aspect of the invention, a computer program product is provided having data stored thereon for causing the imaging system to perform a method for forming an image. In accordance with this method, a set of imaging information is obtained depicting a scene over a period of time. A base image is provided based on the set of image information. Elements are identified in the base image and portions of the set of imaging information depicting each of the elements are ordered according to an attribute of each element. Imaging information from the set of imaging information is selected depicting each element according to the ordering. An image is formed based upon the set of imaging information with the base image incorporating the selected image information.

In another aspect of the invention, a computer program product is provided having data stored thereon for causing imaging system to perform a method for forming a group image. In accordance with this method, images of a scene are obtained at different times. Elements in the images are identified. Attributes for each of the elements in each of the images are determined and it is determined for each element which image shows the element having preferred attributes. An image is prepared of the scene with each element having an appearance that corresponds to the appearance of the element in the image that shows the preferred attributes for the element.

In another aspect of the invention, an imaging system is provided. The imaging system has a source of a set of image information and a signal processor adapted to receive the set of image information identified, to identify elements in the set of image information, to distinguish elements in the set of image information, and to examine the attributes of the elements in the set of image information. Wherein the signal processor is further adapted to select imaging information from the set of imaging information; to taking each element, with the selection being made according to the attributes for that element; and, to form a group image based upon the set of imaging information with the group image incorporating the selected image information.

In still another aspect of the invention, an imaging system is provided. In accordance with this aspect, the imaging system has a source of imaging information and a signal processor adapted to obtain a set of imaging information from the source of imaging information depicting a scene over a period of time. The signal processor provides a base image based upon the set of imaging information and identifies elements in the base image. The signal processor orders the portions of the set of imaging information depicting each of the elements according to an attribute of each element. The processor selects imaging information from the set of imaging information depicting each element according to the ordering and forms a group image incorporating the selected image information.

In accordance with a further embodiment aspect of the invention, an imaging system is provided comprising a source of images of a scene captured at different times. The signal processor is adapted to obtain images from the source, to identify elements in the images, to determine attributes for each of the elements in each of the images and to determine for each element which image shows an element having preferred attributes wherein the signal processor prepares an image of the scene with each element having an appearance that corresponds to the appearance of the element in the image that shows the preferred attributes for the element.

DETAILED DESCRIPTION OF THE INVENTION

Figure 1:
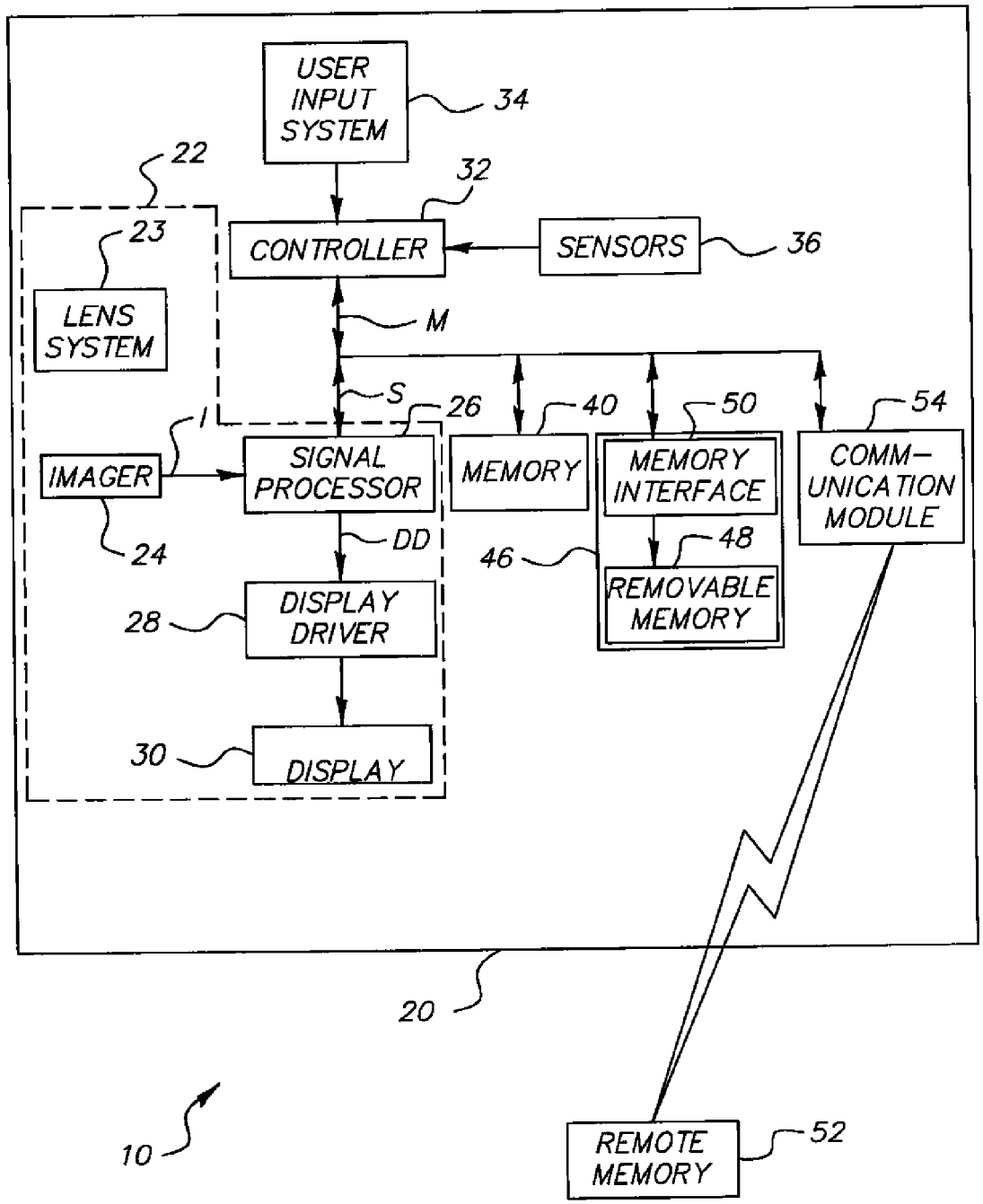
FIG. 1 shows one embodiment of a composite imaging system of the present invention.
Figure 2:
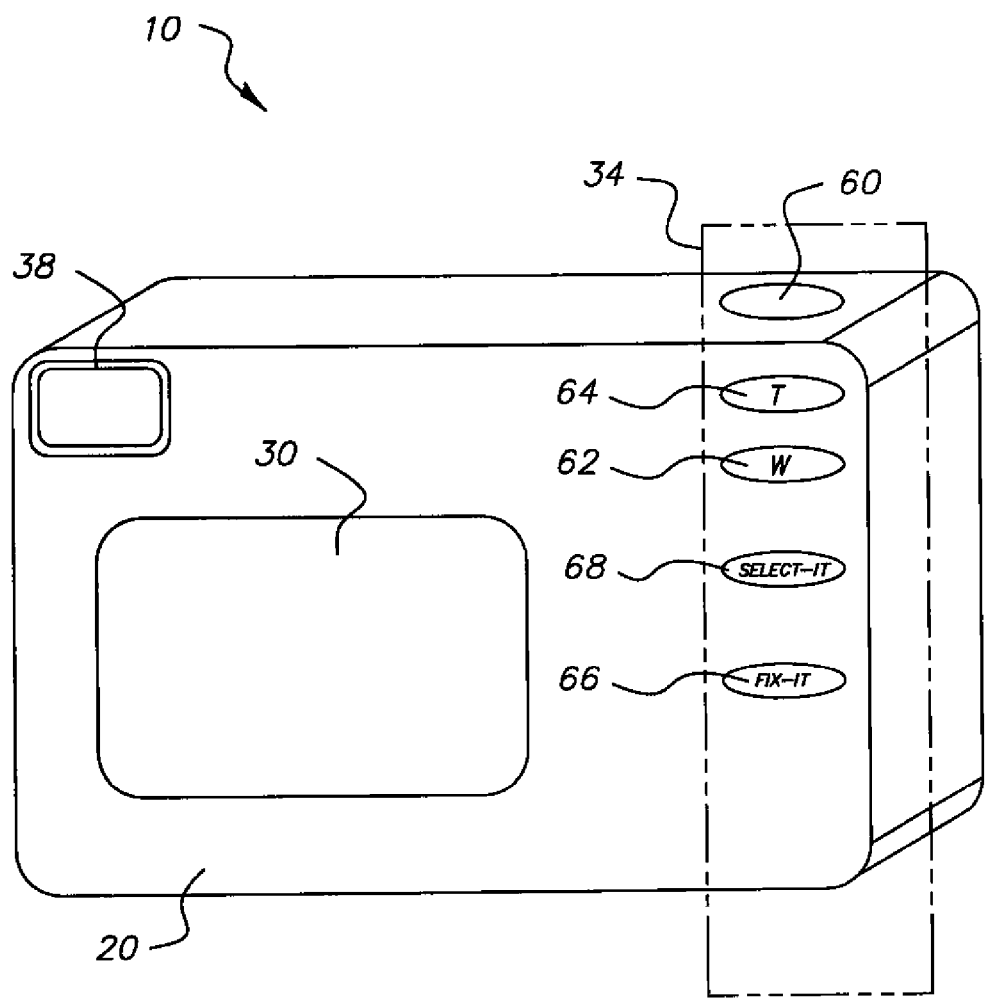
FIG. 2 shows a back view of the embodiment of FIG. 1.

FIG. 1 shows a block diagram of one embodiment of an imaging system 10. FIG. 2 shows a top, back, right side perspective view of the imaging system 10 of FIG. 1. As is shown in FIGS. 1 and 2, imaging system 10 comprises a body 20 containing an image capture system 22 having a lens system 23, an image sensor 24, a signal processor 26, an optional display driver 28 and a display 30. In operation, light from a scene is focused by lens system 23 to form an image on image sensor 24. Lens system 23 can have one or more elements. Lens system 23 can be of a fixed focus type or can be manually or automatically adjustable. Lens system 23 is optionally adjustable to provide a variable zoom that can be varied manually or automatically. Other known arrangements can be used for lens system 23.

Light from the scene that is focused by lens system 23 onto image sensor 24 is converted into image signals I representing an image of the scene. Image sensor 24 can comprise a charge couple device (CCD), a complimentary metal oxide sensor (CMOS), or any other electronic image sensor known to those of ordinary skill in the art. Image signals I can be in digital or analog form.

Signal processor 26 receives image signals I from image sensor 24 and transforms image signal I into a set of imaging information S. Set of image information S can comprise a set of still images or other image information in the form of a video stream of apparently moving images. In such embodiments, the set of image information S can comprise image information in an interleaved or interlaced image form. Signal processor 26 can also apply image processing algorithms to image signals I in the formation of the set of image information S. These can include but are not limited to color and exposure balancing, interpolation and compression. Where image signals I are in the form of analog signals, signal processor 26 converts these analog signals into a digital form.

A controller 32 controls the operation of image capture system 22, including lens system 23, image sensor 24, signal processor 26, and a memory such as memory 40 during imaging operations. Controller 32 causes image sensor 24, signal processor 26, display 30 and memory 40 to capture, store and display images in response to signals received from a user input system 34, data from signal processor 26 and data received from optional sensors 36. Controller 32 can comprise a microprocessor such as a programmable general purpose microprocessor, a dedicated micro-processor or microcontroller, or any other system that can be used to control operation of imaging system 10.

User input system 34 can comprise any form of transducer or other device capable of receiving an input from a user and converting this input into a form that can be used by controller 32 in operating imaging system 10. For example, user input system 34 can comprise a touch screen input, a 4-way switch, a 6-way switch, an 8-way switch, a stylus system, a trackball system, a joystick system, a voice recognition system, a gesture recognition system or other such systems. In the embodiment shown in FIGS. 1 and 2 user input system 34 includes a shutter trigger button 60 that sends a trigger signal to controller 32 indicating a desire to capture an image.

As shown in FIGS. 1 and 2, user input system 34 also includes a wide-angle zoom button 62, and a tele zoom button 64 that controls the zoom settings of lens system 23 causing lens system 23 to zoom out when wide angle zoom button 62 is depressed and to zoom out when tele zoom button 64 is depressed. Wide-angle zoom lens button 62 and telephoto zoom button 64 can also be used to provide signals that cause signal processor 26 to process image signal I to provide a set of image information that appears to have been captured at a different zoom setting than that actually provided by the optical lens system. This can be done by using a subset of the image signal I and interpolating a subset of the image signal I to form the set of image information S. User input system 34 can also include other buttons including the Fix-It button 66 shown in FIG. 2 and the Select-It button 68 shown in FIG. 2, the function of which will be described in greater detail below.

Sensors 36 are optional and can include light sensors, range finders and other sensors known in the art that can be used to detect conditions in the environment surrounding imaging system 10 and to convert this information into a form that can be used by controller 32 in governing operation of imaging system 10.

Controller 32 causes a set of image information S to be captured when a trigger condition is detected. Typically, the trigger condition occurs when a user depresses shutter trigger button 60, however, controller 32 can determine that a trigger condition exists at a particular time, or at a particular time after shutter trigger button 60 is depressed. Alternatively, controller 32 can determine that a trigger condition exists when optional sensors 36 detect certain environmental conditions.

Controller 32 can also be used to generate metadata M in association with each image. Metadata M is data that is related to a set of image information or a portion of set of image information S but that is not necessarily observable in the image data itself. In this regard, controller 32 can receive signals from signal processor 26, camera user input system 34 and other sensors 36 and, optionally, generates metadata M based upon such signals. Metadata M can include but is not limited to information such as the time, date and location that the archival image was captured, the type of image sensor 24, mode setting information, integration time information, taking lens unit setting information that characterizes the process used to capture the archival image and processes, methods and algorithms used by imaging system 10 to form the archival image. Metadata M can also include but is not limited to any other information determined by controller 32 or stored in any memory in imaging system 10 such as information that identifies imaging system 10, and/or instructions for rendering or otherwise processing the archival image with which metadata M is associated that can also be incorporated into the image metadata such an instruction to incorporate a particular message into the image. Metadata M can further include image information such as a set of display data, a set of image information S or any part thereof. Metadata M can also include any other information entered into imaging system 10.

Set of image information S and optional metadata M, can be stored in a compressed form. For example, where set of image information S comprises a sequence of still images, the still images can be stored in a compressed form such as by using the JPEG (Joint Photographic Experts Group) ISO 10918-1 (ITU-T.81) standard. This JPEG compressed image data is stored using the so-called "Exif" image format defined in the Exchangeable Image File Format version 2.2 published by the Japan Electronics and Information Technology Industries Association JEITA CP-3451. Similarly, other compression systems such as the MPEG-4 (Motion Pictures Export Group) or Apple Quicktime™ standard can be used to store a set of image information that is received in a video form. Other image compression and storage forms can be used.

The set of image information S can be stored in a memory such as memory 40. Memory 40 can include conventional memory devices including solid state, magnetic, optical or other data storage devices. Memory 40 can be fixed within imaging system 10 or it can be removable. In the embodiment of FIG. 1, imaging system 10 is shown having a memory card slot 46 that holds a removable memory 48 such as a removable memory card and has a removable memory interface 50 for communicating with removable memory 48. The set of image information can also be stored in a remote memory system 52 that is external to imaging system 10 such as a personal computer, computer network or other imaging system.

In the embodiment shown in FIGS. 1 and 2, imaging system 10 has a communication module 54 for communicating with the remote memory system. The communication module 54 can be for example, an optical, radio frequency or other transducer that converts image and other data into a form that can be conveyed to the remote imaging system by way of an optical signal, radio frequency signal or other form of signal. Communication module 54 can also be used to receive a set of image information and other information from a host computer or network (not shown). Controller 32 can also receive information and instructions from signals received by communication module 54 including but not limited to, signals from a remote control device (not shown) such as a remote trigger button (not shown) and can operate imaging system 10 in accordance with such signals.

Signal processor 26 optionally also converts image signals I into a set of display data DD that is in a format that is appropriate for presentation on display 30. Display 30 can comprise, for example, a color liquid crystal display (LCD), organic light emitting display (OLED) also known as an organic electroluminescent display (OELD) or other type of video display. Display 30 can be external as is shown in FIG. 2, or it can be internal for example used in a viewfinder system 38. Alternatively, imaging system 10 can have more than one display with, for example, one being external and one internal.

Typically, display 30 has less imaging resolution than image sensor 24. Accordingly, signal processor 26 reduces the resolution of image signal I when forming the set of display data DD adapted for presentation on display 30. Down sampling and other conventional techniques for reducing the overall imaging resolution can be used. For example, resampling techniques such as are described in commonly assigned U.S. Pat. No. 5,164,831 "Electronic Still Camera Providing Multi-Format Storage Of Full And Reduced Resolution Images" filed by Kuchta et al., on Mar. 15, 1990, can be used. The set of display data DD can optionally be stored in a memory such as memory 40. The set of display data DD can be adapted to be provided to an optional display driver 28 that can be used to drive display 30. Alternatively, the display data can be converted into signals that can be transmitted by signal processor 26 in a form that directly causes display 30 to present a set of display data DD. Where this is done, display driver 28 can be omitted.

Imaging system 10 can obtain a set of image information in a variety of ways. For example, imaging system 10 can capture a set of image information S using image sensor 24. Imaging operations that can be used to obtain a set of image information S from image capture system 22 include a capture process and can optionally also include a composition process and a verification process.

During the optional composition process, controller 32 causes signal processor 26 to cooperate with image sensor 24 to capture image signals I and present a set of display data DD on display 30. In the embodiment shown in FIGS. 1 and 2, controller 32 enters the image composition phase when shutter trigger button 60 is moved to a half depression position. However, other methods for determining when to enter a composition phase can be used. For example, one of user input system 34, for example, the "fix-it" button 66 shown in FIG. 2 can be depressed by a user of imaging system 10, and can be interpreted by controller 32 as an instruction to enter the composition phase. The set of display data DD presented during composition can help a user to compose the scene for the capture of a set of image information S.

The capture process is executed in response to controller 32 determining that a trigger condition exists. In the embodiment of FIGS. 1 and 2, a trigger signal is generated when shutter trigger button 60 is moved to a full depression condition and controller 32 determines that a trigger condition exists when controller 32 detects the trigger signal. During the capture process, controller 32 sends a capture signal causing digital signal processor 26 to obtain image signals I and to process the image signals I to form a set of image information S. A set of display data DD corresponding the set of image information S is optionally formed for presentation on display 30.

During the verification phase, the corresponding display data DD is supplied to display 30 and is presented for a period of time. This permits a user to verify that the set of image information S is acceptable. In one alternative embodiment, signal processor 26 converts each image signal I into the set of imaging information S and then modifies the set of imaging information to form a set of display data DD.

Figure 4:
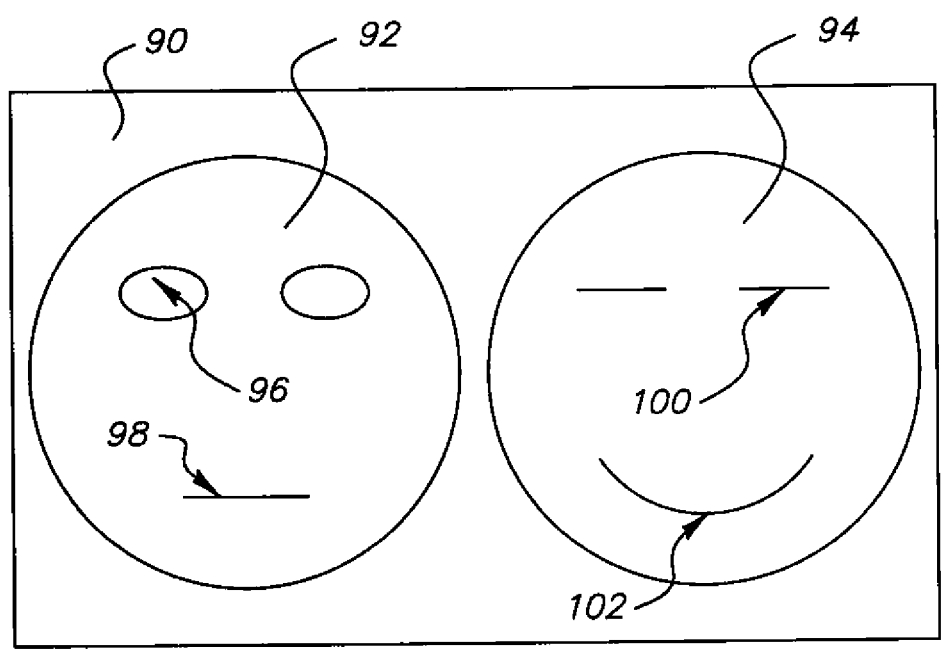
FIG. 4 shows an illustration of objects and elements within an image.
Figure 5:
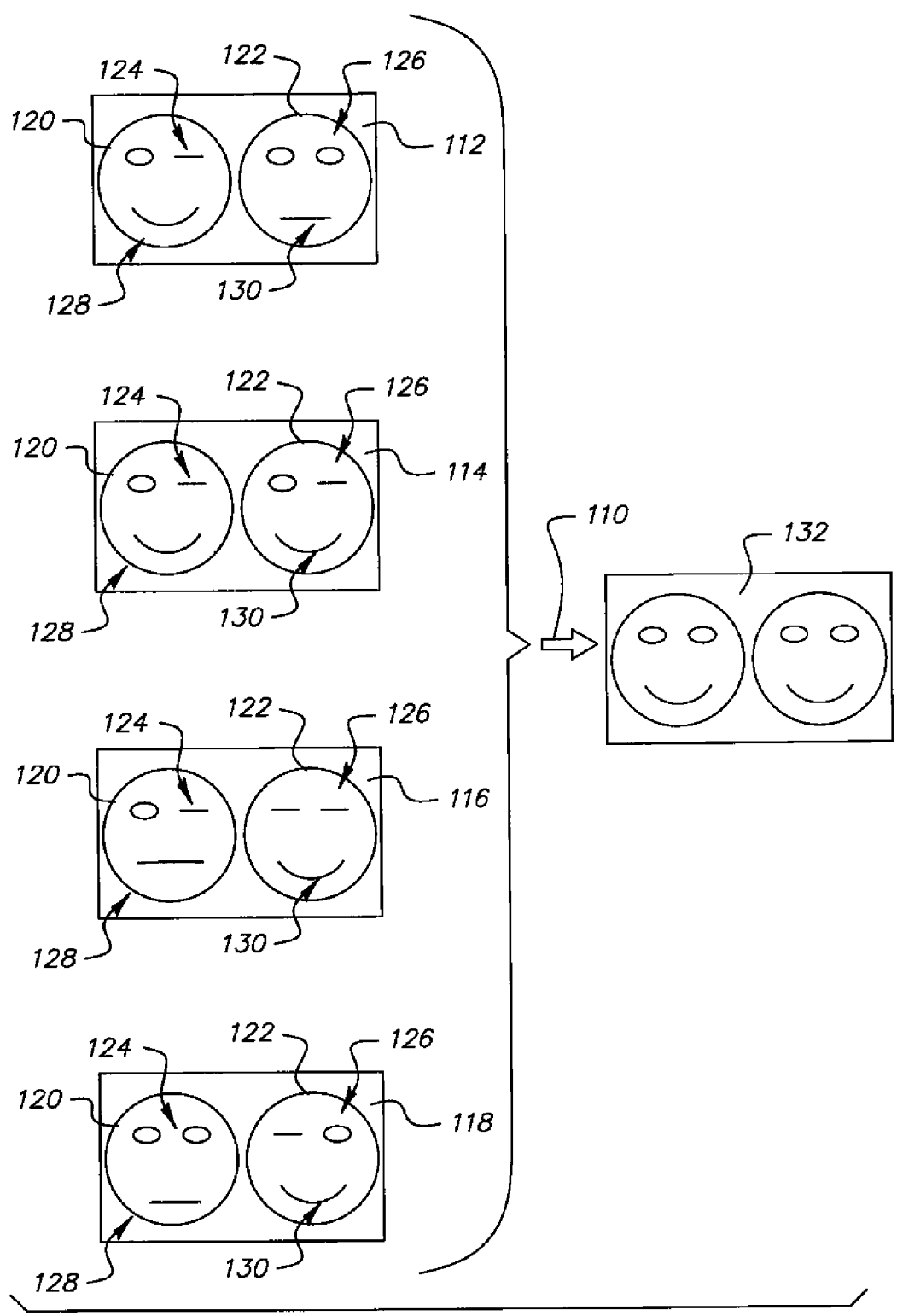
FIG. 5 shows an illustration of the use of a set of image information to form an image.
Figure 6:
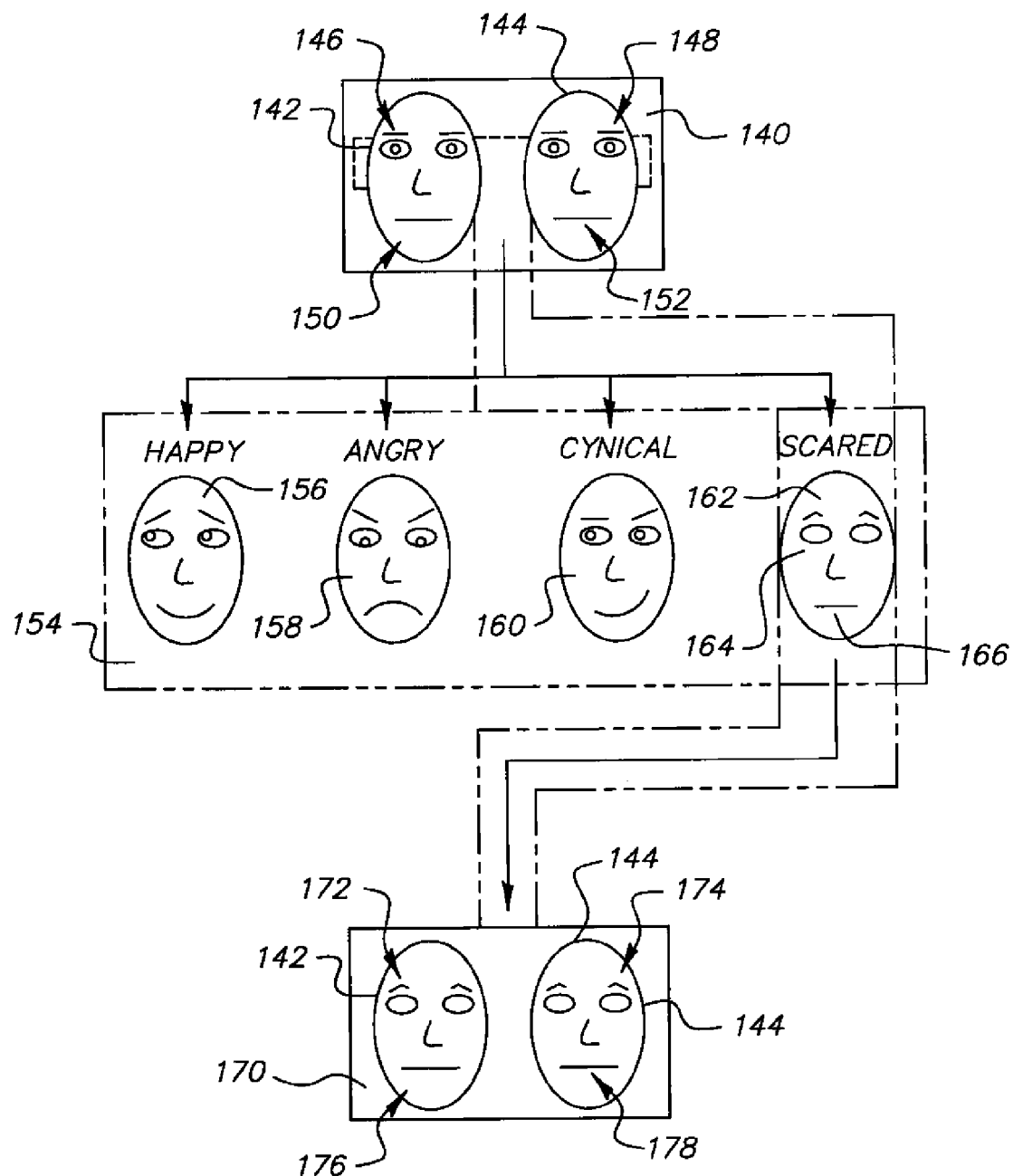
FIG. 6. shows an illustration of the use of a desired facial expression or mood selection to influence the appearance of an image.
Figure 7:
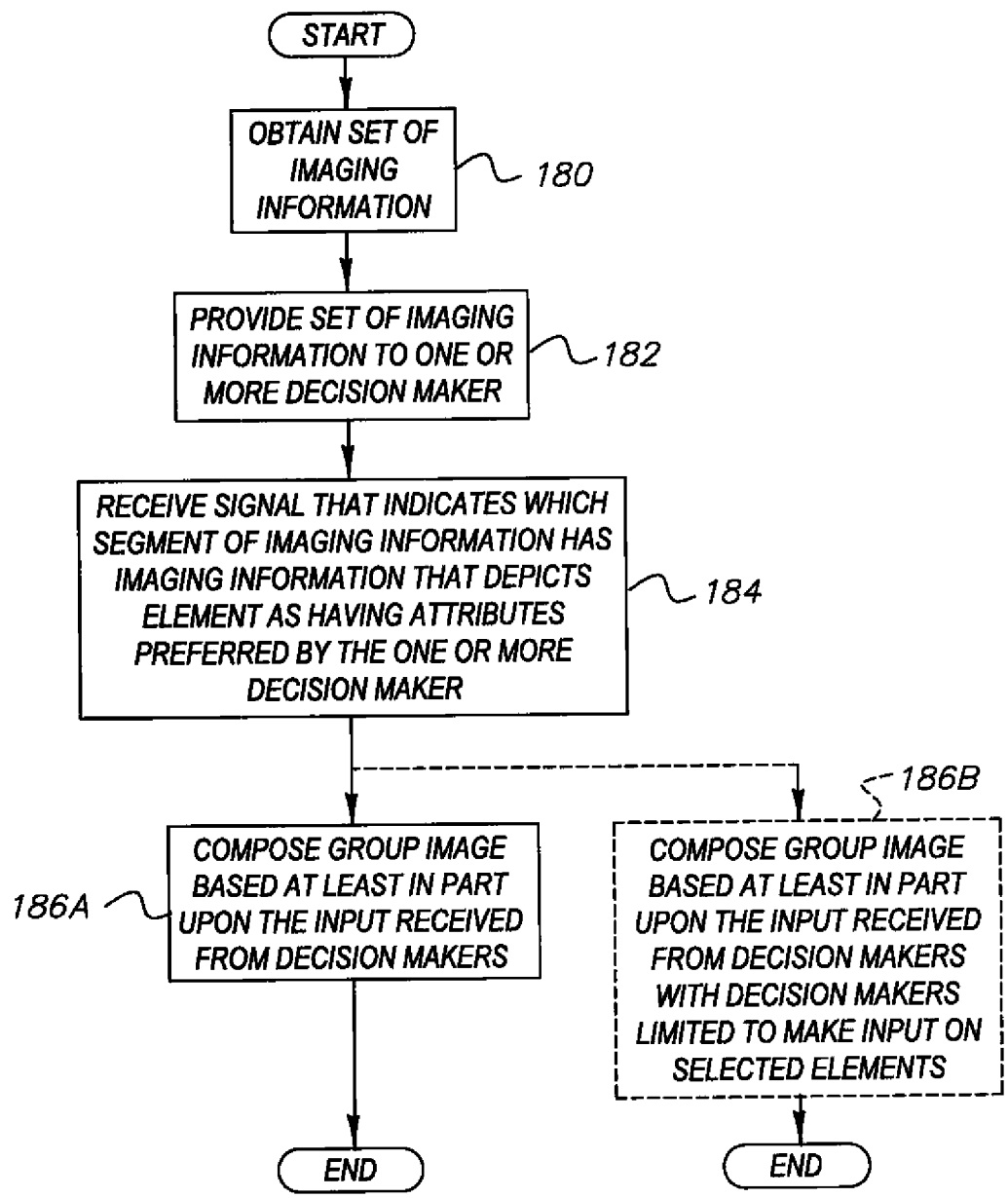
FIG. 7 shows a flow diagram of one embodiment of a method for approving and ordering an image in accordance with the present invention.
Figure 8:
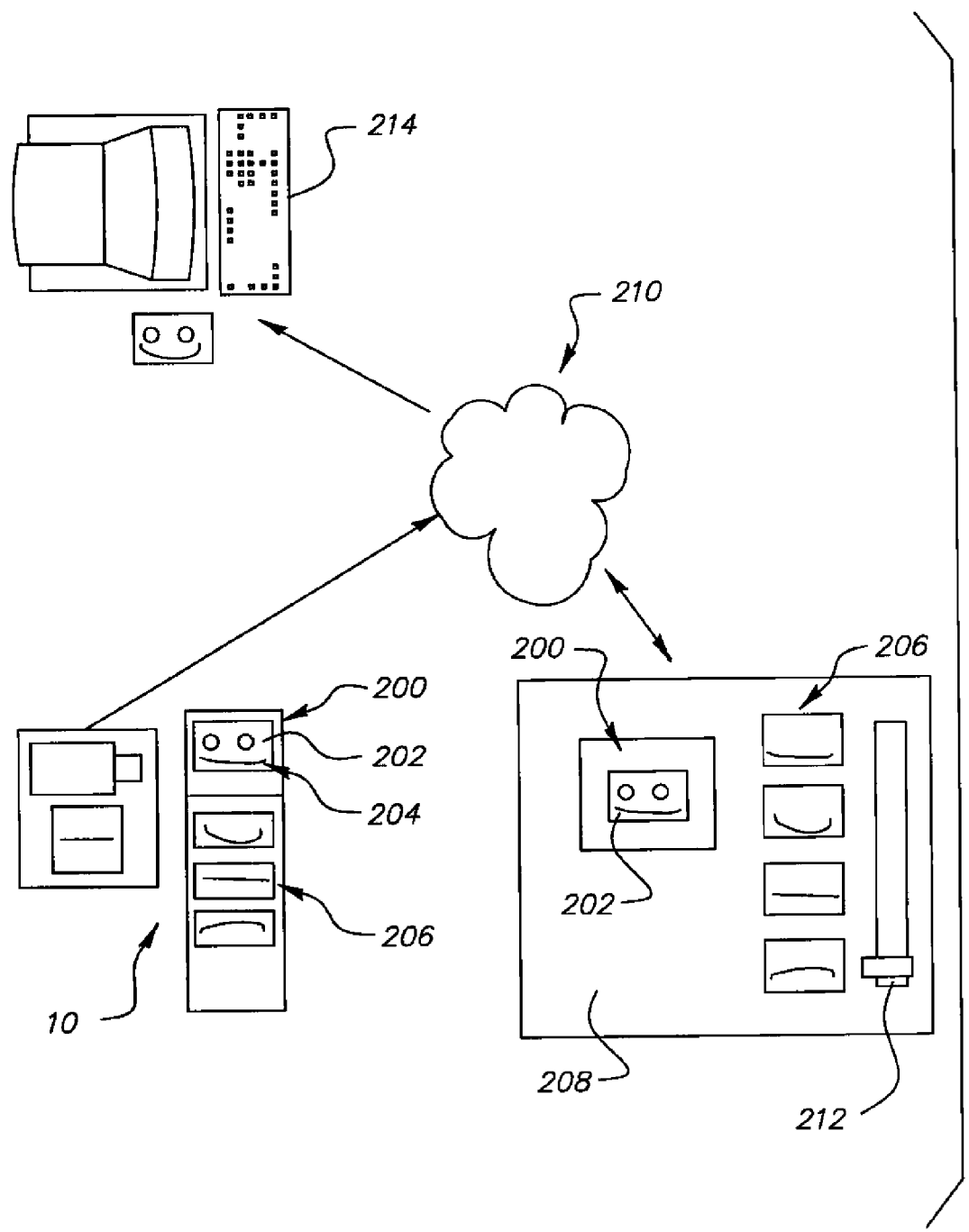
FIG. 8 shows an illustration depicting the operation of another embodiment of the method of the present invention.

The group image forming features of imaging system 10 of FIGS. 1 and 2 will now be described with reference to FIGS. 3, 4, 5, 6, 7, and 8. FIG. 3 shows a flow diagram of an embodiment of a method for composing an image. FIG. 4 shows an illustration of objects and elements within an image. FIG. 5 shows an illustration of the use of a set of image information to form an image. FIG. 6. shows an illustration of the use of a desired facial expression or mood selection to influence the appearance of an image. FIG. 7 shows a flow diagram of an embodiment of a method for approving and ordering an image. FIG. 8 shows an illustration depicting the operation of another embodiment of the method of the present invention. In the following description, a method will be described. However, in another embodiment, the methods described hereinafter can take the form of a computer program product for forming a group image.

The computer program product for performing the described methods can be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program product for performing the described methods may also be stored on a computer readable storage medium that is connected to imaging system 10 by way of the Internet or other communication medium. Those skilled in the art will readily recognize that the equivalent of such a computer program product can also be constructed in hardware.

In describing the following methods, it should be apparent that the computer program product embodiment can be utilized by any well-known computer system, including but not limited to the computing systems incorporated in imaging system 10 described above. However, many other types of computer systems can be used to execute the computer program embodiment. Examples of such other computer systems include personal computers, personal digital assistants, work station, Internet applications and the like. Consequently, the computer system will not be discussed in further detail herein.

Turning now to FIG. 3, the method of forming a group image begins with imaging system 10 entering a mode for forming a group image (step 70). The group image forming mode can be entered automatically with controller 32 entering the mode as a part of an initial start up operation that is executed when imaging system 10 is activated. Alternatively, the group image mode can be entered automatically when signal processor 26 determines that a set of image information contains an arrangement of image elements that suggests that the scene can be beneficially processed using a set of image information. The group image mode can also be entered when controller 32 detects a user selection at user input system 34 such as striking Fix-It button 66 shown in FIG. 2.

A set of image information S is then obtained (step 72). As is described above, the set of imaging information S can be obtained using the imaging operations described above. For example, controller 32 can be adapted to receive a trigger signal from user input 34. When the trigger signal is received, controller 32 causes a set of image information S to be obtained from image sensor 24 depicting the scene over a period of time. This set of image information S can comprise, for example, a sequence of archival still images captured over the period of time. This set of image information S can also comprise interlaced or other forms of video image information captured over the period of time. The period of time can begin at the moment that the trigger condition is detected.

Alternatively, where an image composition phase is used to capture images, controller 32 can cause a set of image information S to be stored in a first in first out buffer in a memory such as memory 40 during composition. Where this is done, the set of image information S can be captured during composition and fed into the buffer, so that at the time controller 32 determines that trigger condition exists, the buffer contains imaging information depicting the scene for a period of time prior to the point in time where controller 32 determines that the trigger condition exists. In this way, the set of imaging information S obtained can include imaging information obtained prior to the detected trigger condition. In another alternative embodiment of the present invention, a set of imaging information S can be obtained from any memory in imaging system 10. For example, the set of imaging information S can be obtained from a removable memory 48 having the set of imaging information recorded therein by another image capture device (not shown). Further, the set of imaging information can be obtained from an external source by way of communication module 54.

Objects and elements within a base image are distinguished within the set of imaging information (step 74). In the embodiment shown, this can be done by selecting a base image from the image stream and identifying objects and elements within the base image. The base image can be selected by selecting the first image in the set of imaging information S, automatically selecting an image that corresponds to scene conditions at the time that the trigger condition is detected, or automatically selecting any other image in the set of imaging information S based on some other selection strategy. The base image contains objects such as a region, person, place, or thing. An object can contain multiple elements for example, where the object is a face of a person, elements can comprise the eyes and mouth of the person. Objects and/or elements can be detected in the imaging information using a variety of detection algorithms and methods including but not limited to human body detection algorithms such as those disclosed in commonly assigned U.S. Patent Application Publication No. 2002/0076100 entitled "Image processing method for detecting human figures in a digital image" filed by Luo on Dec. 14, 2000, and human face recognition algorithms such as those described in commonly assigned U.S. Patent Application Publication No. 2003/

0021448 entitled "Method For Detecting Eye and Mouth Positions in a Digital Image" filed by Chen et al. on May 1, 2001.

It will be appreciated that the step of sorting the image for objects can simplify the process of distinguishing elements within the objects by reducing the set of elements that are likely to be within certain areas of the image. However, this is optional and elements can also be identified in a base image without first distinguishing objects. Further, in certain embodiments, objects and/or elements can be distinguished within the set of imaging information S without first forming a base image.

Attributes of each of the elements are then examined (step 76). Each element has variable attributes that can change over the period of time captured in the set of image information. For example, the eyes of a face can open and close during the period of time, or a mouth can shift from smiling to not smiling. Time variable attributes of elements such as eyes or a mouth can be identified automatically, as they are easily recognizable as being of interest in facial images. However, in certain circumstances the user of imaging system 10 can identify, manually, elements and attributes of interest. Where this is to be done, the base image is presented on display 30 and the user of imaging system 10 can use user input system 34 to identify objects, elements and attributes in the base image that are of interest. Such objects, elements and attributes can be identified for example by name, icon, image, outline, arrow, or other visual or audio symbol or signal. For convenience, the identifier used for the element can be presented on display 30.

FIG. 4 shows a drawing of one example of a base image 90 from a set of image information, its objects, elements, and attributes. Image 90 is composed of two objects: face 92 and face 94. Face 92 is composed of two elements: eye element 96 and mouth element 98. Face 94 is likewise composed of two elements: eye element 100 and mouth element 102. The attribute of eye element 96 is eyes open. The attribute of eye element 100 is eyes closed. The attribute of mouth element 98 is mouth not smiling. The attribute of mouth element 102 is mouth smiling.

Objects and elements distinguished in base image 90 are then distinguished in the other images over the set of imaging information S in like manner (step 78). Attributes of each of the elements are then determined in the remaining portions of the set of imaging information S (step 80).

The imaging information depicting each element in the set of imaging information is ordered in decreasing attribute level across the available imaging information in the set of imaging information (step 82). This ordering is performed by comparing the appearance of each of the elements in the stream of imaging information to preferred attributes for the element (step 82b). For example, if the best group image of a group of people is desired, then the attributes of eyes open and mouth smiling are of high priority. Therefore the imaging information associated with the element can be ordered based upon which imaging information depicts an eye element having the attribute of an open eye at the top of an ordered list and imaging information depicting the eye element having a closed or partially closed eye at the bottom of the ordered list. Similarly, the ordered list of the element of a mouth having the attribute of smiling would be at the top of an ordered list for the mouth element and imaging information depicting a mouth element having a non smiling arrangement would be at the bottom of the ordered list.

The preferred attributes used for the ordering scheme can be determined automatically by analysis of the set of imaging information S to determine what attributes can be preferred for the image (step 82a). Alternatively, the attributes to be used for ordering the image can be set by the user, for example by using user input system 34 (step 82a). Other imaging information ordering criteria can be used where other subjects are involved. For example, where the objects in the image include a group of show dogs posing for an image, while doing a similar acrobatic activity such as jumping, the head direction of each dog can be determined and a preference can be shown for the attribute of each dog facing in the general direction of the camera.

Figure 3A:
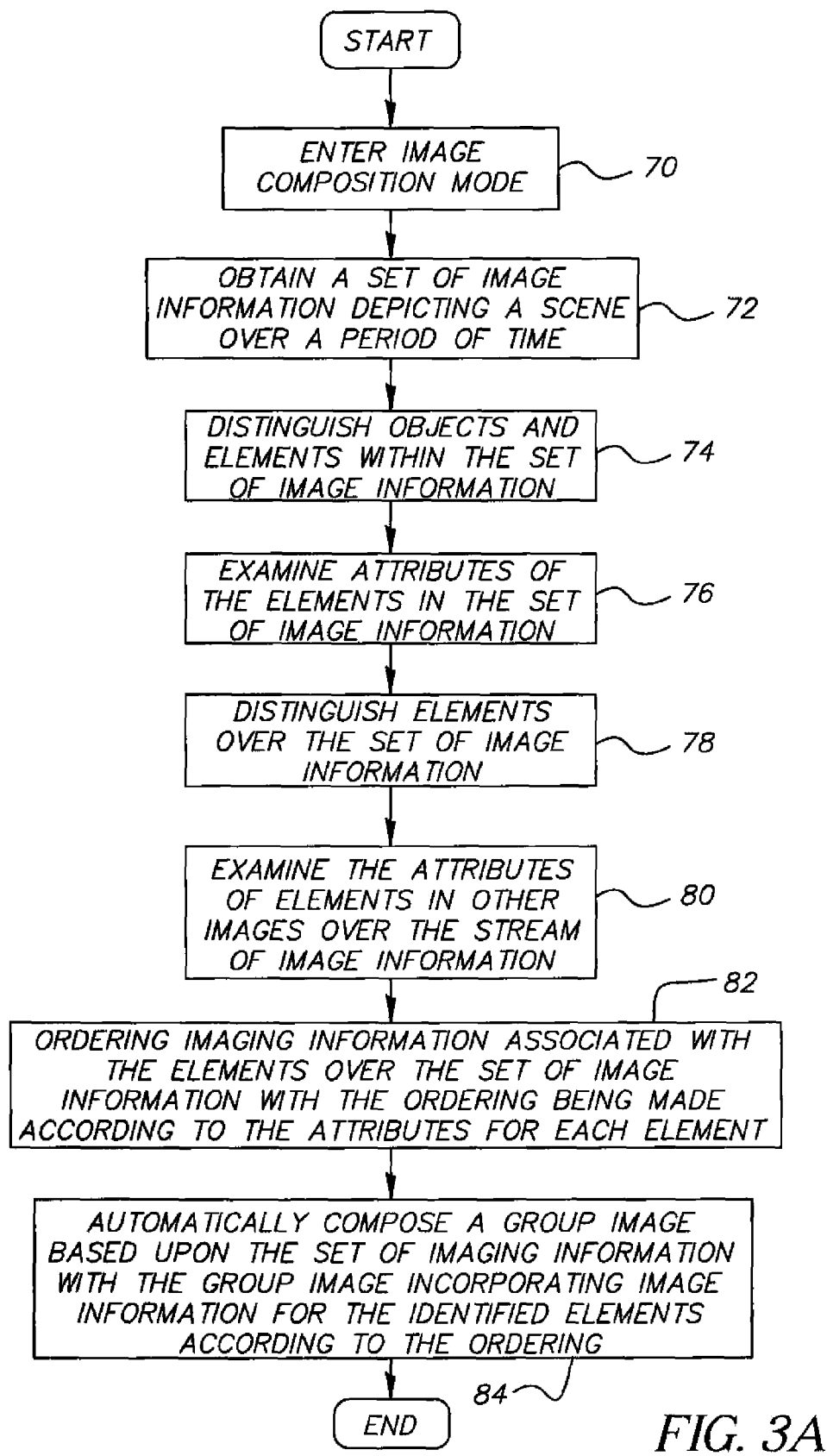
FIG. 3A shows a flow diagram of one embodiment of a method for forming a group image in accordance with the present invention.
Figure 3B:
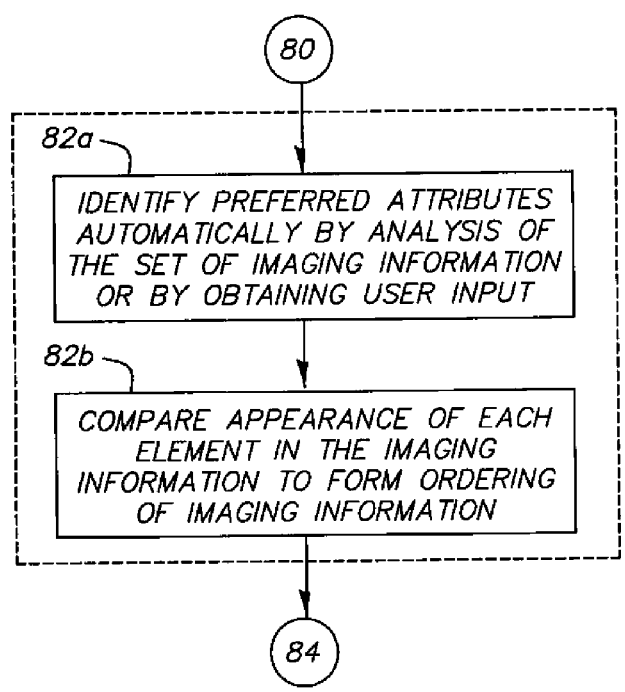
FIG. 3B shows one embodiment of a process for ordering imaging information in the embodiment of FIG. 3A.
Figure 3C:
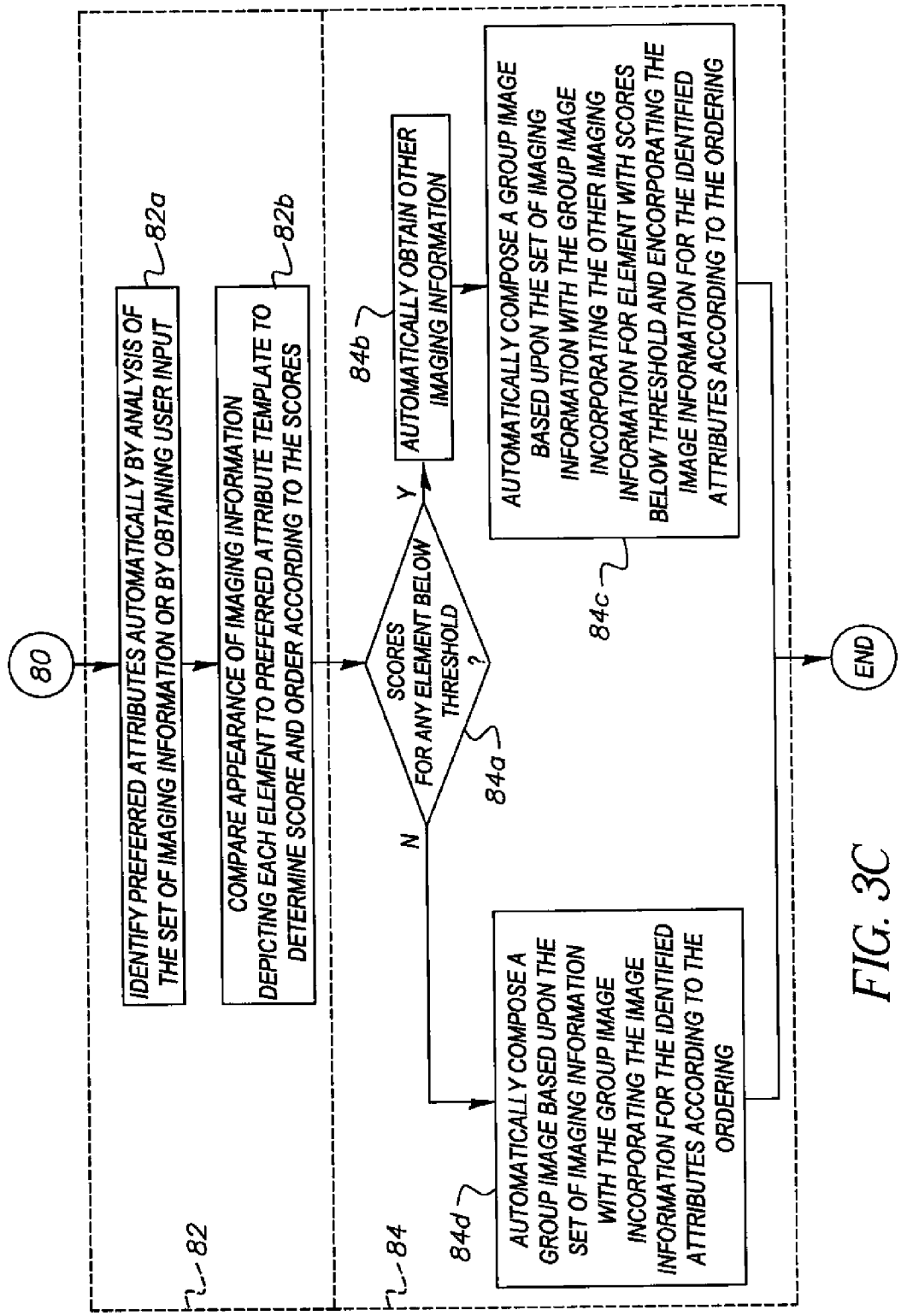
FIG. 3C shows another embodiment of a method for ordering imaging information in the embodiment of FIG. 3A.

FIG. 5 illustrates an example of the operation of the method of FIGS. 3A-3C. FIG. 5 shows a set of imaging information 110 comprising a sequence of four images 112, 114, 116, 118 captured over a period of time. As is shown, each of the images 112, 114, 116 and 118 contains two objects, i.e., faces 120 and 122. The eye elements 124 and 126, and mouth elements 128 and 130 are identified as important image elements. The attributes of eye elements 124 and 126 in image 112 are examined first and then the attributes of eye elements 124 and 126 in images 114, 116, and 118 are examined. The preferred element attributes are then automatically determined: in this case open eyes and smiling mouth.

|        | Elements |        |        |        |
|--------|----------|--------|--------|--------|
| Images | 124      | 128    | 126    | 130    |
| 112    | medium   | high   | high   | medium |
| 114    | medium   | high   | medium | high   |
| 116    | medium   | medium | low    | high   |
| 118    | high     | medium | medium | high   |

An ordered list of imaging information depicting eye attributes 124 and 126 is formed based upon closeness of the attributes of the eye elements in each of images 112, 114, 116 and 118 to the preferred attributes of the eye elements. See Table 2. The imaging information depicting the eye element having highest ordered attributes on the ordered list is used to form a group image 132. Similarly, the mouth elements 128 and 130 in images 112 are examined and compared to the mouth elements 128 and 130 in images 114, 116 and 118, and an ordered list of imaging information having preferred mouth attributes is determined. See Table 2. The mouth elements 128 and 130 that are highest on the ordered list of mouth attributes are used to form the group image 132.

|          | Elements |     |     |     |
|----------|----------|-----|-----|-----|
|          | 124      | 128 | 126 | 130 |
| Priority | 118      | 112 | 112 | 114 |
|          | 112      | 114 | 114 | 116 |
|          | 114      | 116 | 118 | 118 |
|          | 116      | 118 | 116 | 112 |

Other strategems can also be used in forming an ordered list of imaging information.

The group image is then automatically composed (step 84). This can be done in a variety of ways. In one embodiment, controller 32 and signal processor 26 select an interim image for use in forming group image 132. This can be done by selecting the base image 140. Alternatively, controller 32 can cooperate with signal processor 26 to determine which of the images available in the set of imaging information S has the highest overall combined attribute ranking for the various elements examined. Alternatively, controller 32 can cooperate with signal processor 26 to determine which of the images available in set of imaging information S requires the least number of image processing steps to form a group image therefrom. For example, where the fewest number of image processing steps is the criterion for selecting the base image, then image 118 can be selected as only one step needs to be performed the step of fixing the appearance of the smile attribute of face 120. Alternatively, the step of selecting an interim image can comprise selecting the image that can most efficiently or most quickly be improved. For example, in FIG. 5, image 114, requires processing of both eye elements 124 and 126, thus requiring more than one correction, however, the processing effort required to correct the appearance of the eye can be substantially less than the processing effort required to improve the appearance of the mouth element 128 of face object 120 in image 118. Other stratagems can also be used for selecting the interim image.

The attributes of the interim image are then examined to determine whether each of the elements of the objects in the template image has attributes of the highest order for that attribute. Where an element is found that does not have attributes of the highest order, then controller 32 and image processor 26 extract imaging information from the set of imaging information S that corresponds to the highest ordered appearance of that element and inserts that imaging information into the interim image in place of the imaging information in the interim image associated with that element. In this way, a multi-element image is formed with each object in the image having elements with preferred attributes. Further, such attributes are based upon actual scene imaging information such as actual facial expressions and are not based upon imaging information manufactured during the editing process. This provides a group image having a more natural and a more realistic appearance.

It will be appreciated that group photos and other group images can be captured of scenes and circumstances wherein it is not preferred that each member of the group smiles. Rather for certain group photos a different mood or facial expression can be preferred. A user of imaging system 10 can use user input system 34 to define such expressions. For example, a desired facial expression of "scared" can be selected by the user of imaging system 10.

FIG. 6 shows how the selection of the desired facial expression or mood affects the composite picture outcome. In this example, a base image 140 is selected and elements are identified. In the illustration of FIG. 6, base image 140 is comprised of two elements: a first face 142 and a second face 144. First face 142 has a neutral expression and second face 144 has a neutral expression. To compose an image having the desired scared expression, eye elements 146 and 148 and mouth elements 150 and 152 are examined over the time period captured in the set of imaging information and ordered as described above. However, in this example, the ordering is done with eye elements 146 and 148 and mouth elements 150 and 152 ordered in accordance with their similarity to eye elements 164 and mouth element 166 associated with a scared expression template 162 stored within a template library 154 that also contains other expression templates such as a happy template 156, an angry template 158 and cynical template 160. The template library 154 can comprise, for example, a library of template images or other imaging information such as image analysis and processing algorithms that associate the attributes of elements in an object, such as a mouth or eye elements in a facial image, with an expression. The templates in library 154 therefore can comprise images, algorithms, models and other data that can be used to evaluate the attributes of the elements detected in each object in the scene. The templates can be based on overall typical anamorphic facial expressions or the templates can be derived based upon previous photographs or other images of first face 142 and second face 144. The templates can be stored in imaging system 10 or in a remote device that can be contacted by way of communication module 54.

As is shown in FIG. 6, after ordering, a group image 170 is then composed as is described above, with each object, e.g. face 142 and 144 having scared eye elements 172 and 174, respectively and scared mouth elements 176 and 178 having an appearance associated with the highest ordered attributes of the elements (step 84*d*).

It will be appreciated that, in certain circumstances, the set of imaging information S may not contain an expression that appropriately represents the desired expression or that does not suggest the desired expression to the extent desired. Accordingly, a threshold test can optionally be used. For example, in the embodiment shown, in FIG. 6, the ordering process can be performed so that the attributes of the features in the set of imaging information S are compared to scared template 162 and ordered according to a scoring scale (step 82*b*). When this is done, the overall score for second face 144, for example, can be compared to a threshold (step 84*a*). Where the score is below the threshold, it can be determined that the set of imaging information S does not contain sufficient information for an appearance of the expression desired. When this occurs, controller 32 can use communication module 54 to obtain imaging information depicting the elements having desired attributes from a remote memory system 52 having a database or template library depicting second face 144 (step 84*b*). Controller 32 incorporates this remotely obtained imaging information into group image 170 in order to more closely adapt the appearance of eye elements 148 and mouth elements 152 of second face 144 to the desired "scared" expression to yield the group image 170 wherein second face 144 has the scared eye element 174 and scared mouth element 178 that correspond to the desired (step 84*c*).

The selection of a desired expression can be made in a variety of ways. For example, the selection can be made on an image by image basis with the selection made once for each image and applied to all elements in the image. Alternatively, the selection of the desired expression can be made on an element by element basis with each element having an individually selected desired expression or other desired attribute. For example, certain persons may feel that their appearance is optimized under circumstances where they have a big smile while other persons may feel that their appearance is optimized with a more subdued expression. In such circumstances, desired expressions can be selected for each person in an image.

FIG. 7 shows an alternative embodiment of the present invention in which at the ordering process is performed in a semi-automatic fashion. In this embodiment, a set of imaging information S is obtained (step 180). Controller 32 can obtain the set of imaging information to be sent by capturing archival images or a set of archival imaging information such as a video stream as is described above. Controller 32 can also obtain a set of images to be sent by extracting the digital images from a memory, such as a removable memory 48. A set of imaging information can also be obtained using communication module 54.

The set of imaging information S is provided to one or more decision makers (step 182). Controller 32 can provide the set of imaging information S to each decision maker such as for example a person whose image is incorporated into the set of imaging information S. This can be done, for example, by presenting the set of imaging information S to the person using display 30 or by using communication module 54 to transmit the set of imaging information S to a remote terminal, personal digital assistant, personal computer or other display device.

After the set of imaging information S has been provided to the decision makers, each decision maker reviews the set of imaging information and provides an indication of which image in the set of imaging information has objects with elements having desired attributes (step 184). This can be done in a variety of ways. For example, where an image includes a group of elements, a decision can be made for each element in the set of imaging information S as to which portion of the set of imaging information S depicts the element as having favored attributes. For example, one or more elements can be isolated for example by highlighting the element in a base image and a decision maker can then select from the imaging information that portion of the imaging information that depicts that element as having favored attributes. This selection can be made using user input system 34 for example by depressing the select-it button 68 shown in FIG. 2.

When a selection is made, user input system 34 generates a signal that indicates which segment of the set of imaging information S has imaging information that depicts that person with elements having the attributes preferred by that person. Controller 32 detects the signals from user input system 34 to indicate that the selected image contains desired attributes. It will be appreciated that circumstances can arise where more than one decision maker makes recommendations as to which portion of a set of imaging information S contains a preferred attribute. Such conflicts can be prevented by limiting certain decision makers to providing input only on selected elements. For example, where a group image comprises an image of a group of people, each person in the image can act as a decision maker for the elements associated with that person but not for others. Alternatively, such conflicts can be resolved by providing each person in the image with a different group image tailored to the preferences of that person. The user input information can be used to help form the group image in two ways. In one way a user preference can be used in place of the ordering step described above. Alternatively, the ordering steps described above in previous embodiments can be used and the user preference information can be used to adjust the ordering performed on the imaging information.

Controller 32 then forms a group image based at least in part upon the input received from user input system 34 (step 186). There are a number of ways that this can be done. For example, a single group image can be formed based upon the input from all of the decision makers (step 186a). Alternatively, controller 32 can be used to monitor the inputs from each decision maker with the group image selected by each decision maker using the input made by other decision makers to adjust the ordering of attributes of the elements (step 186b).

FIG. 8 shows an illustration of another embodiment of the method of the present invention. In this embodiment, an interim image 200 is generated by the imaging system 10 as described above. Interim image 200 contains imaging information that depicts an object 202 which is shown in FIG. 8 as a face object having a mouth element 204. In this embodiment the set of imaging information depicting the mouth element is extracted from the set of imaging information and incorporated into the interim image as metadata 206 associated with interim image 200. The image and metadata are transmitted by imaging system 10 to a home unit 208 such as a personal computer, personal digital assistant, or other device by way of a communication network 210. In this embodiment, metadata 206 is incorporated into interim image 200 in a way that permits a user of the home receiver to access metadata 206 using software such as image editing software, image processing software or a conventional web browser. The home user receives interim image 200 and, if desired, indicates that the user wishes to change or consider the option for changing the attributes of one of the elements. This can be done, for example, by hovering a mouse cursor over mouth element 204 of face object 202 in interim image 200 or otherwise indicating that an area of interim image 200 contains an element.

When this occurs, home unit 208 extracts the set of imaging information associated with mouth element 204 from metadata 206 and provides imaging information based upon the set of imaging information from which the home user can select attributes that are preferable to the home user. In the embodiment illustrated, when the home user indicates a desire to change the appearance of mouth element 204, a slide bar 212 appears on home unit 208. By sliding slide bar 212 the user can move through the available set of imaging information associated with that image and select imaging information having preferred attributes. The home receiver records an indication of which attributes are found to be preferable by the home user and adjusts the image to include those attributes. This allows each person captured in an image to adjust the attributes for that person in the archival image in order to optimize their appearance. The adjusted group image can be adapted so that the adjusted group image and any copies of the image made from the adjusted group image will contain the preferred image attributes. In another alternative of this type, each recipient of the group image is provided with a copy of the group image that contains metadata for each image element and can select attributes for each element to form a local group image that is customized to the preferences of the recipient.

Optionally, the home receiver also provides a feedback signal by way of communication network 210 to imaging system 10 or some other device 214 such as a storage device, server or printer containing the interim image with the feedback signal indicating adjustments made by home unit 208. This information can be received by imaging system 10 or other storage device 214 and then used to form an adjusted archival image having a user selected and optimized appearance. It will be appreciated that such editing can be performed by user input system 34 to perform the function of selecting desirable attributes for the adjusted archival image.

Although imaging system 10 has been shown generally in the form of a digital still or motion image camera type imaging system, it will be appreciated that imaging system 10 of the present invention can be incorporated into and the methods and computer program product described herein can be used by any device that is capable of processing a set of imaging information examples of which include: cellular telephones; personal digital assistants; hand held, tablet, desktop, notebook and other personal computers and image processing appliances such as internet appliances and kiosks. Further, imaging system 10 can comprise a film or still image scanning system with lens system 23 and image sensor 24 adapted to scan imaging information from a set of images on a photographic film or prints and can even be adapted to obtain image information from a set of film image negatives. In such an application, imaging system 10 can comprise for example a personal computer, workstation, or other general purpose computing system having such an imaging system.

Alternatively, imaging system 10 can also comprise a scanning system having a scanner for obtaining imaging information from film, paper or other tangible medium of expression, such as those employed in conventional photofinishing systems such as the photographic processing apparatus described in commonly assigned U.S. Pat. No. 6,476,903 entitled "Image Processing" filed by Slater et al. on Jun. 21, 2000.

The invention has been described in detail with particular reference to preferred embodiments thereof, but it will be understood that variations and modifications can be effected within the spirit and scope of the invention.

PARTS LIST

| | |
|---|---|
| 10 | imaging system |
| 20 | body |
| 22 | image capture system |
| 23 | lens system |
| 24 | image sensor |
| 26 | signal processor |
| 28 | display driver |
| 30 | display |
| 32 | controller |
| 34 | user input system |
| 36 | sensors |
| 38 | viewfinder |
| 40 | memory |
| 46 | removable memory slot |
| 48 | removable memory |
| 50 | removable memory interface |
| 52 | remote memory system |
| 54 | communication module |
| 60 | shutter trigger button |
| 62 | "wide" angle zoom button |
| 64 | "tele" zoom button |
| 66 | fix-it button |
| 68 | select-it button |
| 70 | enter group image forming mode step |
| 72 | obtain set of imaging information step |
| 74 | distinguish objects and elements step |
| 76 | examine attributes of elements step |
| 78 | distinguish objects and elements over set of imaging information step |
| 80 | examine attributes of elements over set of imaging information step |
| 82 | order imaging information step |
| 84 | compose image step |
| 90 | base image |
| 92 | face |
| 94 | face |
| 96 | eye element |
| 98 | mouth element |
| 100 | eye element |
| 102 | mouth element |
| 110 | set of imaging information |
| 112 | image |
| 114 | image |
| 116 | image |
| 118 | image |
| 120 | face object |
| 122 | face object |
| 124 | eye element |
| 126 | eye element |
| 128 | mouth element |
| 130 | mouth element |
| 132 | group image |
| 140 | base image |
| 142 | face |
| 144 | face |
| 146 | eye element |
| 148 | eye element |
| 150 | mouth element |
| 152 | mouth element |
| 154 | template library |
| 156 | happy template |
| 158 | angry template |

PARTS LIST -continued

| | |
|---|---|
| 160 | cynical template |
| 162 | scared template |
| 164 | eye element |
| 166 | mouth element |
| 170 | group image |
| 172 | scared eye element |
| 174 | scared eye element |
| 176 | scared mouth element |
| 178 | scared mouth element |
| 180 | obtain set of imaging information step |
| 182 | provide set of imaging information to decision maker(s) step |
| 184 | receive selection signal step |
| 186 | form image based on selection signal step |
| 200 | interim image |
| 202 | face object |
| 204 | mouth element |
| 206 | metadata |
| 208 | home unit |
| 210 | communication network |
| 212 | slide bar |
| 214 | other device |

The invention claimed is:

1. A method for forming a composite image of a scene, the method comprising:

using an imaging device to capture a set of images depicting a scene over a period of time;

acquiring input indicating a desired criterion;

automatically identifying, using a processor, objects and associated elements within the set of images, the elements having attributes corresponding to the desired criterion;

automatically ordering the elements, using the processor, by assigning scores to the elements according to an attribute of the elements relative to the desired criterion, wherein the desired criterion indicates mood or expression including one or more of: happy, sad, cynical, angry, scared, neutral or smiling;

determining, using the processor, for each image from the set of images a combined score based, at least in part, on the scores from each image's elements relative to the desired criterion;

selecting, using the processor, a base image from the set of images, wherein the base image comprises that image from the set of images with the highest combined score;

modifying the base image with one or more of the elements to form a composite image of the scene; and displaying the composite image on an electronic display or storing the composite image in an electronic storage device.

2. The method as set forth in claim 1 wherein the processor is remote from the imaging device.

3. The method as set forth in claim 1 wherein the desired criterion comprises a facial mood or expression with eyes opened.

4. The method as set forth in claim 1 wherein the imaging device is a digital still camera, a motion image camera, a cellular telephone, a personal digital assistant, a hand held tablet, a desktop computer, a notebook computer, a image processing appliance, an internet appliances, or a kiosk.

5. The method as set forth in claim 2 wherein the remote processor is linked via a network.

6. The method as set forth in claim 1 wherein the input is acquired from an input device comprising a touch screen input, a 4-way switch, a 6-way switch, an 8-way switch, a stylus system, a trackball system, a joystick system, a voice recognition system, or a gesture recognition system.

7. The method as set forth in claim 1, wherein the highest score is assigned to the image requiring the least number of image processing steps to be formed into the composite image.

8. The method as set forth in claim 1, wherein modifying further comprises:

examining the base image to identify each element that does not have an attribute having the highest score relative to the desired criterion;

determining the highest score for each element of each object relating to the desired criterion from the set of images; and replacing each element of the base image not having an attribute of the highest score with elements from another of the images having attributes of the highest score relative to the desired criterion, wherein elements already having attributes of the highest score relative to the desired criterion in the base image are not replaced.

9. The method as set forth in claim 1, wherein the set of images comprises a set of video images.

10. A non-transitory computer readable medium comprising instructions stored thereon to cause one or more processors to:

capture, using an imaging device, a set of images depicting a scene over a period of time;

acquire input indicating a desired criterion;

automatically identify objects and associated elements within the set of images, the elements having attributes corresponding to the desired criterion;

automatically order the elements by assigning a scores to the elements according to an attribute of the elements relative to the desired criterion wherein the desired criterion indicates mood or expression including one or more of: happy, sad, cynical, angry, scared, neutral or smiling;

determine for each image from the set of images a combined score based, at least in part, on the scores from each image's elements relative to the desired criterion;

select a base image from the set of images, wherein the base image comprises that image from the set of images with the highest combined score;

modify the base image with one or more of the elements to form a composite image of the scene; and display or store the composite image.

* * * * *